United States Patent [19]

Brands Aeter et al.

[11] Patent Number: 4,561,073
[45] Date of Patent: Dec. 24, 1985

[54] SYSTEM FOR SORTING SEISMIC DATA IN MARINE SURVEYS

[75] Inventors: Helge Brands Aeter, Stabekk; Tor A. Ommundsen, Saetre; Oyvind Mjoen, Blommenholm, all of Norway

[73] Assignee: Geophysical Company of Norway A.S., Hovik, Norway

[21] Appl. No.: 378,015

[22] Filed: May 13, 1982

[30] Foreign Application Priority Data

May 26, 1981 [NO] Norway ................................. 811786

[51] Int. Cl.⁴ ........................ G03H 3/00; G01V 1/38; G01S 9/66
[52] U.S. Cl. ......................................... 367/19; 367/7; 367/88
[58] Field of Search ................. 367/7, 19, 21, 88, 106, 367/23, 38, 68, 72, 107, 111, 116

[56] References Cited

U.S. PATENT DOCUMENTS

| | | | |
|---|---|---|---|
| 2,528,730 | 11/1950 | Rines | 367/7 X |
| 2,700,895 | 2/1955 | Carson | 367/7 X |
| 2,762,031 | 9/1956 | Fryklund | 367/7 X |
| 3,097,522 | 7/1963 | Weller, Jr. | 367/7 X |
| 3,286,225 | 11/1966 | Huckabay et al. | 367/23 |
| 3,622,825 | 11/1971 | Bennett | 367/7 X |
| 3,840,845 | 10/1974 | Brown | 367/17 |
| 3,953,827 | 4/1976 | Le Moal et al. | 367/19 |
| 4,231,111 | 10/1980 | Neeley | 367/19 |
| 4,236,233 | 11/1980 | Davis, Jr. et al. | 367/38 X |
| 4,237,737 | 12/1980 | Nitadori | 367/7 X |
| 4,323,990 | 4/1982 | Goode et al. | 367/74 X |
| 4,397,007 | 8/1983 | Goode et al. | 367/74 X |
| 4,404,664 | 9/1983 | Zachariadis | 367/19 |

FOREIGN PATENT DOCUMENTS 810368 8/1981 Norway .
810369 8/1981 Norway .

Primary Examiner—Charles T. Jordan
Assistant Examiner—Brian S. Steinberger
Attorney, Agent, or Firm—Holman & Stern

[57] ABSTRACT

A system for sorting data from seismic surveys at sea. The data are acquired by signal transmission/receiving by streamer cables, which streamers are equipped with position-defining instruments. For the sorting, the area to be surveyed is subdivided into squares of defined size and position. The data provided through the measurements is sorted, and accepted data is processed further and transferred to the individual squares in the grid pattern. On the basis of the data, the configuration and position of the streamer is also computed, and information regarding this is displayed on a screen. On the basis of these results, the coverage of the measurement area may be determined, and an adjustment of the vessel's steering can be carried out to allow one to obtain the best coverage of the area. The acquired data is stored for later treatment.

3 Claims, 6 Drawing Figures

FIG. 6

SYSTEM FOR SORTING SEISMIC DATA IN MARINE SURVEYS

BACKGROUND OF THE INVENTION

1. Field of the Invention

The invention relates to a system for sorting data from seismic surveys at sea, wherein data relating to geophysical conditions is recorded together with the geographical position continuously during measurements performed with the aid of streamer cables.

2. Description of the Prior Art

For the acquisition of seismic data at sea, it is conventional practice to tow sets of air guns behind a vessel. The air guns emit pulses which are reflected from different layers of the sea bed, and the reflections are received by an acoustic cable and recorded. Simultaneously, the position of the cable is recorded, so that the individual pulses can be coordinated to the locations of the acquisition of data. A method of such position determination by means of angular headings is described, e.g., in U.S. Pat. No. 3,953,827.

When long streamer cables are being towed behind a ship, they will be influenced by wind and current conditions. Therefore, it is also important at all times to know where the towed cable is located, so that navigation of the vessel can to some degree be adapted to the prevailing conditions. The use of angular headings for position determination can be utilized for recording the cable position, and such a method is described, e.g., in U.S. patent application Ser. No. 885,916 (filed Mar. 13, 1978) U.S. Pat. No. 4,231,111.

With such measurements, however, there will in every instance arise a number of sources of error, which make correct recording and plotting of the earth formation difficult.

In the methods utilized previously for the acquisition of seismic data, it has been conventional to gather the data more or less in a linear direction behind a ship, the ship, following a course so as to form a series of adjacent and parallel lines and corresponding lines crosswise of the first lines. Thus, one obtains data along the lines of a grid or network, so it could be said that the data constitute a framework for the grid squares.

The drawbacks of the known method wherein data is collected in lines include that these lines do not have a uniform configuration owing to deviations caused by current conditions, e.g. wind, etc. Therefore, the recording and analysis of the results are also encumbered by sources of error.

BRIEF SUMMARY OF THE INVENTION

The object of the present invention is to provide compensation for these sources of error, at any rate to a certain degree, so as to obtain as accurate a picture of the earth formation as possible. The invention can thus be considered a sorting system, or as a way of forming a special sorting pattern for the acquired data which are obtained by seismic recordings from a streamer cable.

The method of the invention is based on a new and different approach. The region that is to be surveyed is divided into a grid or into squares in advance, and the aim of the method of the invention is to collect the recorded data within the grid squares and not along the framework of the squares.

With the invention, therefore, a new recording technique is provided which consists of collecting data within grid squares. The data within each cell of the grid can then be processed according to the intended purpose so as to obtain maximum yield from the recorded information, i.e., one can evaluate the measurement results in each square on the basis of average evaluations and thus obtain a value for each square, which value is more accurate than previously-obtained data, or the data can provide a better "resolution" and structure analysis. One can thus utilize the acquired data in several ways or according to several criteria in order to obtain the best possible picture. The required condition for accomplishing this, however, is that the measurements must be stringently keyed to the position, something which in turn provides advantages in collecting data inside squares of a grid. Acquired data can be transferred to or placed in the correct square until each individual square has been filled in on this basis; thus, the streamer will be independent of any bends in its course, since it is not linear shape which is important, but only that the determination of position is correct. Poor coverage of individual areas will be clearly apparent from the filling in of the squares, so that a poorly covered area can be re-measured, which can be done in a simple manner. A consequence of the method of the invention is that one can also utilize the acquired data for direct steering and control of both the ship's and the cable's position, via a data monitor. This gives advantages both for the data acquisition and for ship maneuvering, and the skilled person will at all times receive an indication of the existing conditions and whether the data recording is following a favorable pattern. One will thus be able to overlap or to repeat measurements of poorly-recorded areas immediately without first having to have carried out an extensive analysis of the acquired data.

To obtain a further monitoring of the acquired data, it has been found practical from the measuring/technical point of view to divide the streamer into a plurality of measurement subgroups. Conveniently, the streamer is divided into three main subgroups. The advantage of such sectional division is that one can monitor a smaller data group and thereby obtain an overview of the distribution of data received from different positions on the cable. The ratio and positions of the separate groups are evaluated, so that a picture of the whole is obtained. It is thus simple to set up criteria for acceptable measurement values. It can be said that good reflection results are obtained from the streamer if one obtains data from all three groups on the cable. Further, a certain percentage of measurements results ought to be obtained from each group. This percentage can be continuously recorded and determines the quality of the measurements, while at the same time the procedure is simplified in that the percentage of coverage in each group can be followed.

BRIEF DESCRIPTION OF THE DRAWINGS

The invention will be elucidated further in the following description of an exemplary embodiment thereof, as illustrated in the accompanying drawings, wherein:

FIG. 6 illustrates how the data acquired in accordance with the system is displayed.

DETAILED DESCRIPTION

Figure 1:
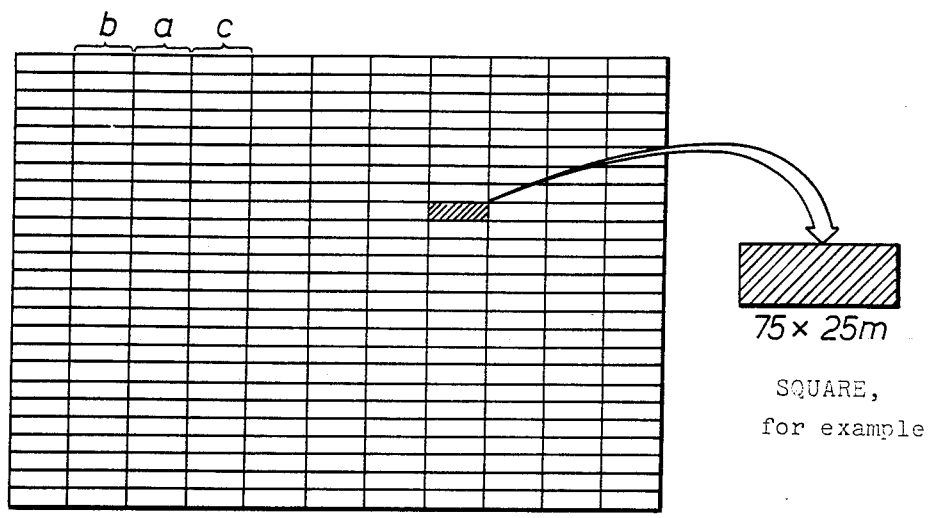
FIG. 1 is a schematic illustration of the grid division in accordance with the invention.
Figure 2:
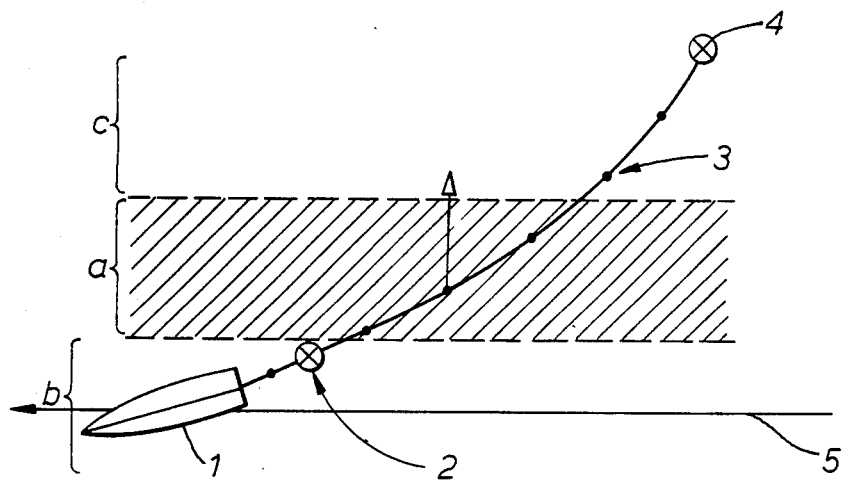
FIG. 2 is a schematic view showing a vessel with streamer cable during the measuring operation.

When seismic data is to be acquired for a specific area, this area is first subdivided into squares, as illustrated in FIG. 1, each square having a defined size and position within the area that is to be recorded. As the data are collected, they are recorded within the individual squares until a minimum degree of coverage in all squares is obtained. The recorded data thus obtained is stored and relayed to a central data processor for further evaluation and computation of the geophysical conditions. The acquisition per se of the data is carried out by a vessel which follows a certain pattern, e.g., over columns of squares, and thereby receives data. FIG. 2 illustrates how this is done. A vessel 1 is equipped with a streamer cable, from which seismic pulses are transmitted at 2, and there reflection signals are measured along the cable. At the measurement locations, position-defining instruments are provided, e.g., so-called "compasses", which in FIG. 2 are designated by numeral 3. As mentioned above, the streamer cable is divided into subgroups, preferably three, and each subgroup is continuously monitored and the values at any instant for the measured reflection signal and position of each subgroup are recorded and plotted. The subgroup closest to the vessel measures the near-traces of the reflected signal, the subgroup farthest from the vessel measures the distant-traces; and the subgroup in between measures the middle-traces. The streamer cable also has a tail buoy 4 for further definition of position. When the vessel sails along the line 5, the streamer cable will not in most cases be located directly in back of the vessel, owing to wind and currents which cause drift. The main measurement in the example illustrated in FIG. 2 will thus occur in the region designated by the letter a, while the vessel itself is sailing in the region designated by the letter b, and whereby recording data also comes from the region c. The invention takes these displacements into account, and the data from the respective regions, on the basis of the position definitions from the compasses 3, are placed in the correct square in the grid pattern of FIG. 1. Thus, even if the streamer cable does not follow the desired course, the data recorded can be utilized, and by displaying an image on board the ship which shows the position of the cable, as indicated in FIG. 2, it will also be possible to influence the steering of the vessel to obtain desirable results. Individual features of the system of the invention may be seen in FIGS. 3–5.

Figure 3:
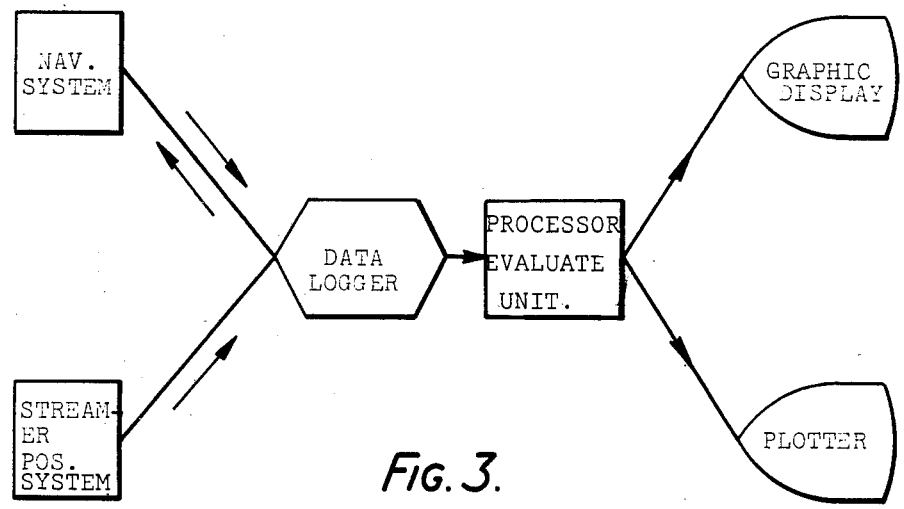
FIGS. 3 and 4 are block diagrams illustrating the system of the invention.

FIG. 3 shows how data from both the vessel's navigation system and from the streamer's position-defining system, along with the seismic data, are relayed to a data logger. These data are processed further and evaluated in a control unit designed for this purpose, and the results are exhibited on two displays, one giving information of significance for the further course navigation of the vessel and the continuation of the measurements, and the other display in principle showing the degree of filling-in or coverage in the grid squares. The data which are controlled and evaluated in the data logger are used to influence the ship's navigation system.

Figure 4:
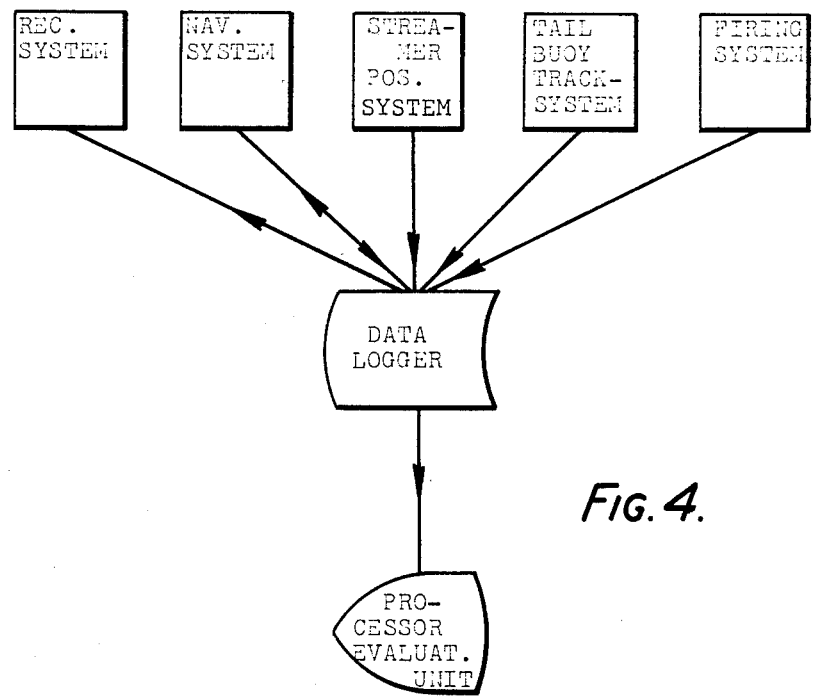

FIG. 4 shows a somewhat more detailed diagram of the system. The input to the data logger consists of information from the navigation system, the streamer positioning system, the tail buoy tracking system and from a control means for the seismic signal transmitter. This information may be utilized for correction of the navigation system so as to improve the data acquisition and is also relayed to a recording system wherein the position information is coordinated with the acquired seismic data. The measurement and evaluation in the data logger are monitored by a control system which controls the acquired data and the coverage of the grid square.

Figure 5:
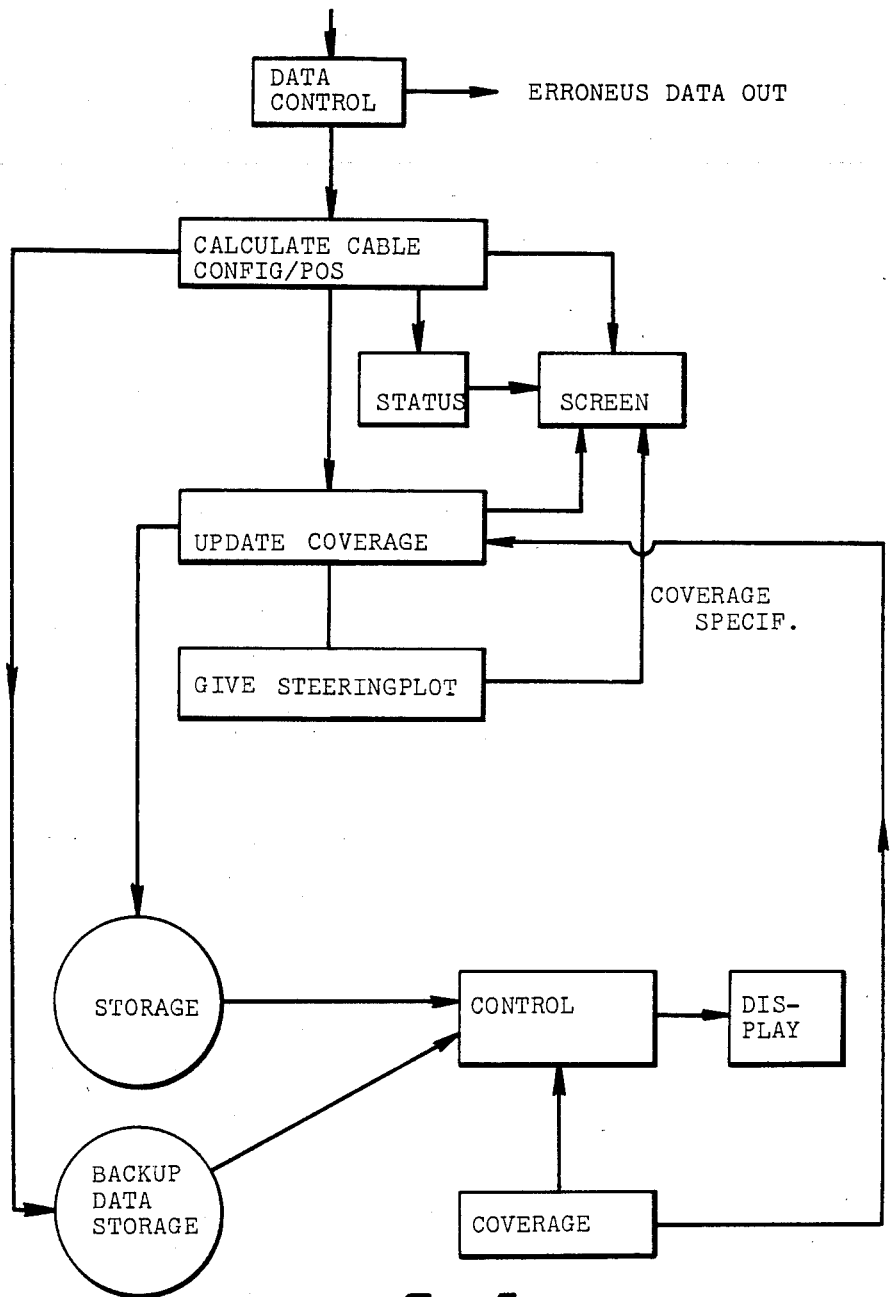
FIG. 5 is a flow diagram of the data processing of the system.

FIG. 5 shows a more detailed flow diagram of the measurement, control and evaluation of the acquired data quantity with respect to position determination. The acquired data are first controlled, and erroneous data is discarded. On the basis of the accepted data, a computation of the streamer configuration and position is carried out, and this is compared with a given status for the measurement. The results obtained are also displayed on a screen, and one may select which information one wishes to have displayed. The computed results for the streamer position and configuration are then compared with any previously acquired data to determine the degree of coverage in the area being surveyed. On the basis of this result, steering instructions may be given, which are computed and presented continuously in real time and are utilized to direct the further sailing of the vessel so as to obtain the best possible coverage. These results are also displayed on the screen.

The updated data are stored and are transferred together with reserve storage data to a control unit where the coverage can be controlled, and where an indication is also given of satisfactory/unsatisfactory results. On the basis of these data and the data which are displayed on the previously-mentioned screen, it will be possible to obtain a desired coverage of data information for all squares in a grid area, which data are collected and analyzed at a later time.

Figure 6:
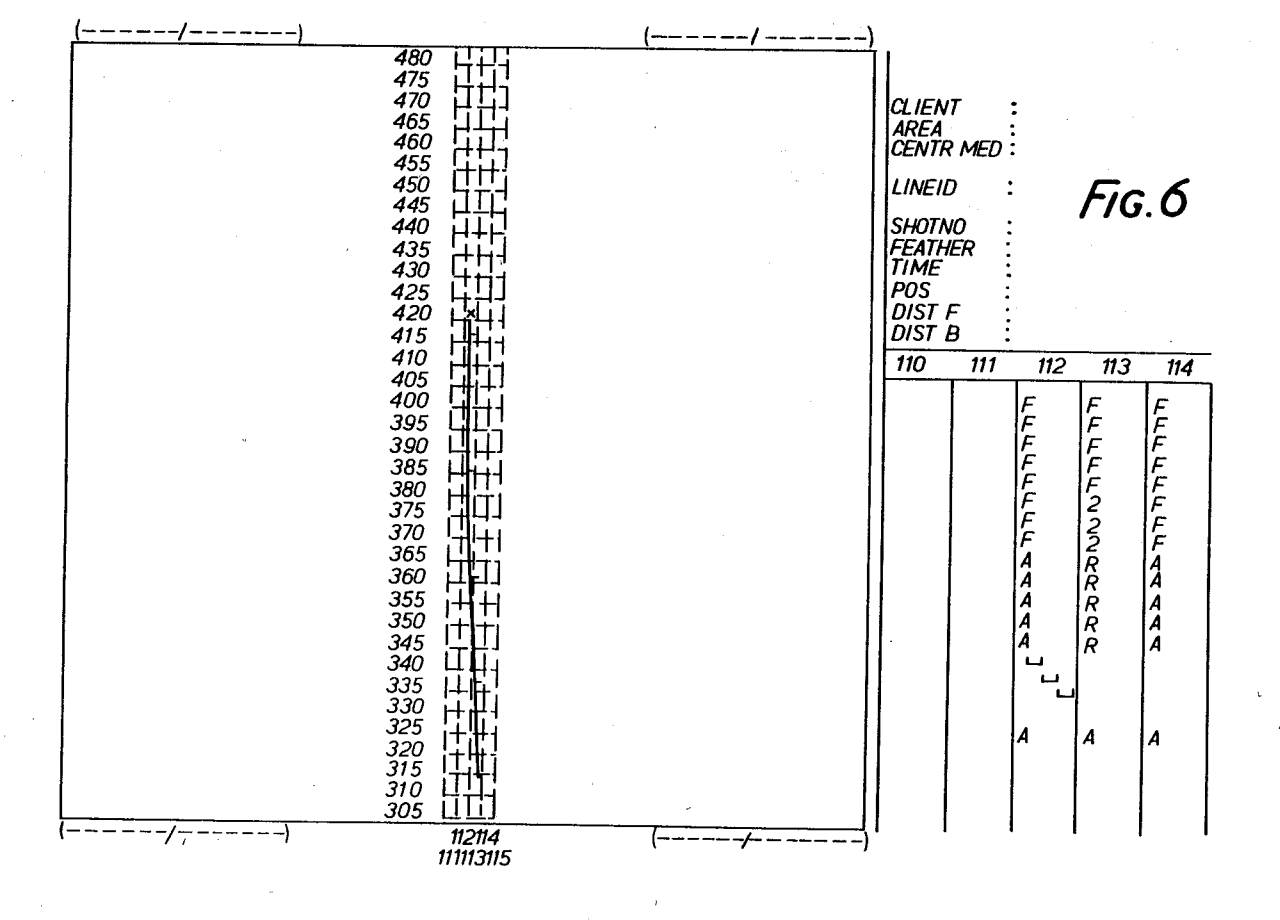

FIG. 6 shows an example of the picture one may obtain on the screen, which provides information about the situation at the moment in the data acquisition operation. The right-hand corner in the figure gives the status of the survey, containing information as to which area is being surveyed and information about signal transmission, etc. At the left in the figure, a picture will appear of the cable's position, with a sub-grid network also drawn in. At the lower right-hand side, information showing whether the obtained measurement values are satisfactory is displayed. On this picture, also a schematic illustration of the position of the streamer cable itself, in the form of three bracket symbols, may be seen. These three bracket symbols show the division of the cable into three subgroups, and one sees here that each individual group can be followed and evaluated in regard to its position.

With the invention, therefore, a system is provided which renders it possible to monitor the acquisition of data from seismic surveys of the sea bed in such a way that one obtains the best possible degree of coverage with acceptable data, which data is also of such type that a clear picture of the geophysical conditions can be drawn.

The practical use of the system according to the invention includes the following operations and elements:

(A) Transmit a signal by seismic signal transmitter such as air guns.

(B) Measure reflection signals by acoustic streamer cables.

(C) Detect position of reflection signal measuring means on streamer cable by position-defining means such as compasses suitable for mounting in streamer cables.

(D) Locate the geographical position of an area to be surveyed by a navigation system of known type together with a draft (chart) over the relevant area, and subdivide the area into a grid of rectangles to define the searching area.

(E) Receive and sort data from the measuring means and position-defining means with a computer of known type such.

(F) Receive and process accepted data and transfer it to respective individual rectangles of the grid and compute configuration and position of streamer cables with a computer utlizing suitable software. This can be done according to different alternative methods, e.g., in a known method a tangent is laid at the compass point, and circles are drawn through this. The computing of distances and angles are described in U.S. Pat. No. 4,231,111 referred to above.

(G) Display the control data, recording data and streamer cable position on a grid of individual rectangles to shown the coverage of the individual rectangles continuously during the surveying operation on a display device such as a conventional monitor screen.

(H) Evaluate the displayed data with a further monitor on the ship's bridge connected to the ship navigation system.

(I) Determine the acquisition of sufficient data in ordered form by a computer which controls the data against certain parameters which are inserted previously.

(J) Store the sufficient data, using a tape, for example, as a storage medium for later use.

We claim:

1. In a system for measuring and collecting data from seismic surveys at sea with the aid of a vessel including at least one seismic signal transmitter operatively connected to the vessel to be towed thereby, at least one acoustic streamer cable operatively connected to the vessel to be towed thereby having means located along said cable for measuring reflection signals produced by said at least one transmitter, and position defining means at the locations of said reflection signal measuring means, the improvement comprising:

means to subdivide an area to be surveyed into a grid of individual rectangles of a defined size and geographical position;

said at least one streamer cable being divided along its length into a plurality of subgroups of said reflection signals measuring means and respective position defining means so that the subgroups provide seismic data of near-traces from the subgroup closest to the vessel, distant-traces from the subgroup farthest from the vessel and middle-traces from at least one subgroup between said nearest and farthest subgroup;

control means to continuously receive and sort independently and simultaneously data from said near-traces, middle-traces and distant-traces to obtain and transmit the measured reflection and position defining data therefrom;

a computing unit for receiving and processing said measured reflection and position defining data and transferring it to the respective individual rectangles of said grid and computing from said measured reflection and position defining data the configuration and position of the subgroups of the streamer cable;

display means to continuously during the surveying operation display control data, recording data and streamer cable position on a grid of individual rectangles corresponding to the rectangles formed by subdividing the area being surveyed to show the coverage of said data in the individual rectangles of the grid;

means to evaluate said displayed data operatively connected to the vesses's navigation system for use in navigating the vessel;

means to compare said measured reflection and position defining data with known data to determine the degree of coverage in the area being surveyed so that a single pass of the vessel over said area produces a substantially complete survey; and means to store said data.

2. A system as claimed in claim 1 wherein, said plurality of subgroups comprises three subgroups, and further comprising a tail buoy attached to the outer end of said streamer cable, and a position-defining means on said tail buoy.

3. A system as claimed in claim 1 wherein, said position-defining means comprises a magnetic compass.

* * * * *